United States Patent
Chi et al.

(10) Patent No.: US 7,203,899 B2
(45) Date of Patent: Apr. 10, 2007

(54) SYSTEMS AND METHODS FOR ASSESSING USER SUCCESS RATES OF ACCESSING INFORMATION IN A COLLECTION OF CONTENTS

(75) Inventors: Ed H. Chi, Palo Alto, CA (US); Peter L. T. Pirolli, San Francisco, CA (US)

(73) Assignee: Xerox Corporation, Stamford, CT (US)

( * ) Notice: Subject to any disclaimer, the term of this patent is extended or adjusted under 35 U.S.C. 154(b) by 693 days.

(21) Appl. No.: 10/063,344

(22) Filed: Apr. 12, 2002

(65) Prior Publication Data

US 2003/0195944 A1  Oct. 16, 2003

(51) Int. Cl.
*G06F 17/00* (2006.01)

(52) U.S. Cl. ............ 715/514; 715/501.1; 715/538

(58) Field of Classification Search ........... 715/500, 715/501.1, 514, 530, 538
See application file for complete search history.

(56) References Cited

U.S. PATENT DOCUMENTS

| | | | | |
|---|---|---|---|---|
| 5,835,905 A * | 11/1998 | Pirolli et al. | ............ | 707/3 |
| 5,895,470 A * | 4/1999 | Pirolli et al. | ............ | 707/102 |
| 6,038,574 A * | 3/2000 | Pitkow et al. | ............ | 715/513 |
| 6,098,064 A * | 8/2000 | Pirolli et al. | ............ | 707/2 |
| 6,115,718 A * | 9/2000 | Huberman et al. | ........ | 707/102 |
| 6,151,595 A * | 11/2000 | Pirolli et al. | ............ | 707/1 |
| 6,182,091 B1 * | 1/2001 | Pitkow et al. | ............ | 715/501.1 |
| 6,272,507 B1 * | 8/2001 | Pirolli et al. | ............ | 715/513 |
| 6,286,018 B1 * | 9/2001 | Pitkow et al. | ............ | 715/513 |
| 6,369,819 B1 * | 4/2002 | Pitkow et al. | ............ | 345/440 |
| 6,457,028 B1 * | 9/2002 | Pitkow et al. | ............ | 715/513 |
| 6,509,898 B2 * | 1/2003 | Chi et al. | ............ | 345/440 |
| 6,567,797 B1 * | 5/2003 | Schuetze et al. | ........ | 707/2 |
| 6,646,652 B2 * | 11/2003 | Card et al. | ............ | 345/645 |
| 6,671,711 B1 * | 12/2003 | Pirolli et al. | ............ | 709/200 |
| 2002/0067360 A1 * | 6/2002 | Chi et al. | ............ | 345/441 |
| 2002/0118214 A1 * | 8/2002 | Card et al. | ............ | 345/619 |
| 2002/0143802 A1 * | 10/2002 | Chi et al. | ............ | 707/203 |
| 2002/0143940 A1 * | 10/2002 | Chi et al. | ............ | 709/225 |
| 2003/0018636 A1 * | 1/2003 | Chi et al. | ............ | 707/6 |
| 2003/0074368 A1 * | 4/2003 | Schuetze et al. | ..... | 707/103 R |
| 2003/0085931 A1 * | 5/2003 | Card et al. | ............ | 345/853 |

OTHER PUBLICATIONS

Chi et al., "Using Information Scent to Model User Information Needs and Actions on the Web", *SIGCHI'01*, Mar. 31-Apr. 4, 2001, Seattle, WA, USA.

* cited by examiner

*Primary Examiner*—Stephen Hong
*Assistant Examiner*—Gregory J. Vaughn
(74) *Attorney, Agent, or Firm*—Oliff & Berridge, PLC

(57) ABSTRACT

Systems and methods measure the navigability of a web site by determining the rate at which simulated users absorb information scent. This note can be viewed as a measurement of accomplishing the users' information goals. As users reach their target information, the users terminate their navigation in the web site. Thus, the rate at which users finish is a measurement of the navigability of the web site.

15 Claims, 4 Drawing Sheets

SYSTEMS AND METHODS FOR ASSESSING USER SUCCESS RATES OF ACCESSING INFORMATION IN A COLLECTION OF CONTENTS

CROSS-REFERENCE TO RELATED APPLICATIONS AND PATENTS

The present application is related to the following applications and patent: application Ser. No. 09/540,976, now issued as U.S. Pat. No. 6,671,711; application Ser. No. 09/820,706 now issued as U.S. Pat. No. 6,907,459; and U.S. Pat. No. 5,835,905, the contents of which are herein incorporated by reference.

BACKGROUND OF THE INVENTION

1. Field of Invention

This invention relates to assessing usability of a web site. In particular, this invention relates to the measurement of user success rates of accessing information of a web site.

2. Description of Related Art

Increasingly, the World Wide Web has become the information delivery mechanism of choice for both corporations and individuals users. The ubiquity of World Wide Web browsers and the push by many corporations to adopt common off the shelf technology (COTS) have all helped the World Wide Web become a required delivery option for most information systems.

However, although information sources are now more likely to be available to their intended audience through the World Wide Web, the access to relevant information is still limited by a user's ability to navigate the World Wide Web and the destination web site and to actively accumulate the required information. Many designers of web sites seek ways to quantify the user's experience in a web site. Using this information, one may design a web site suited for various tasks. For example, a web site designer of a county government tax assessors office site may assume any query will be related to county tax assessment. In contrast, the web site designer for an online department store needs to provide a user with access to product information ranging from toasters to jewelry. The web site designer of an internal corporate information site may need to provide access to corporate tax information, real estate holdings, business permits and/or health and safety records. Naturally, certain tasks are better addressed by one web site in comparison with another web site, and certain information needs are satisfied more easily by one web site than other web sites.

Accordingly, web site designers, information system managers and researchers are constantly developing new tools to gain understanding into the paths that users follow to obtain the information they need. For example, web site designers, researchers and web site banner advertisers seeking to place information on the most relevant web site have used a variety of techniques to analyze web log files. Web log files contain information concerning which web page referred the user to the site as well as which web pages were visited within the site. Information concerning the user's IP address and browser type is also frequently saved for review in the web log file. Tools such as INSIGHT™ from Accrue Corporation, ASTRA SITE MANAGER™ from Mercury Interactive provide a way to describe how users have traversed the web site in the past.

WebCriteria's Site Analysis product provides statistics accumulated through the use of the MAX™ software agent product. The MAX™ software agent traverses the web site to derive usability metrics from simulated browsing. However, the simulated browsing merely provides a random walk of a web site. Simulated browsing based on a random walk assumes the user's navigational choices at any juncture are random and simply ignores the presence of informational cues on each page and surrounding each link.

There are known techniques that uses linkage and content analysis for the purpose of performing information retrieval. In Chakrabarti et al., "Automatic Resource Compilation by Analyzing Hyperlink Structure and Associated Text," In Proc. of the $7^{th}$ International World Wide Web Conference (WWW7), pp. 65–74, Brisbane, Australia, 1998, and Silva et al., "Link-based and Content-Based Evidential Information in a Belief Network Model," In Proc. of the $21^{st}$ ACM SIGIR Conference on Research and Development in Information Retrieval, pp. 96–103, Athens, Greece 2000, a combination of keywords and links is used to determine a ranking weight for retrieval results. However, neither reference makes any attempt to predict the usage of a web site based on user's information needs. They do not provide web site designers with an objective prediction that is useful in describing how the changes to a document or web page affect the way a user with a specific information need will traverse the site.

SUMMARY OF THE INVENTION

Accordingly, the systems and methods for assessing usability of a document collection or web site according to this invention are advantageous, for example, because the use of user traces from a user log to determine the usability of a web site is not required. In various exemplary embodiments, systems and methods provide predictive statistics on the usability of a web site that are informed by an analysis of the design of the web site. In actual use of a web site, informational cues influence a user's decision as to whether one path through the web site is chosen over another path.

The systems and methods according to this invention may be used in the field of analysis and design of hypermedia linked collections of documents, and in the prediction of user traffic flow in such a collection without relying on observed usage information.

The methods and systems according to this invention measures user success rates of accessing information of a web site. For example, the exemplary embodiments according to this invention measure the success rate of users attempting to find specific pieces of information in a collection of documents. Given an information need and some starting point, exemplary embodiments measure predicted number of users that may reach the destination page containing the information needed.

In various exemplary embodiments, a topology determining circuit determines at least one content in the collection of contents with a connection in a connection topology. In various exemplary embodiments, a proximal cue analyzing circuit to determine at least one proximal information associated with the connection in the connection topology. In various embodiments, a controller converts at least one content in the collection of contents into a termination point. In various embodiments, a spreading activation circuit initiates at least one first spreading activation from a content in the collection of contents, the first spreading activation simulating a number of predictable movements through the collection of contents. In various embodiments, the controller determines at least a first value of the number of predictable movements through the collection of contents that reached the termination point based on the proximal information related to the connection in the connection topology.

In various embodiments, the spreading activation circuit initiates at least one cycle of spreading activation from a content in the collection of contents, the second spreading activation cycle simulating a number of predictable movements through the collection of contents prior to the controller converting at least one content in the collection of contents into a termination point. In various embodiments, the controller determines at least a second value of the number of predictable movements through the collection of contents based on the proximal information related to the connection in the connection topology, and to compensate the first value with the second value.

In various embodiments, the controller determines contents in the collection of contents that perform as termination points prior to converting at least one content in the collection of contents into a termination point. In various embodiments, the controller modifies the contents that perform as termination points to provide passage to another content.

In various embodiments, the controller initiates a predetermined number of iterations of the first spreading activation. In various embodiments, the controller determines the first value after each iteration. In various embodiments, the controller initiates a predetermined number of iterations of the second spreading activation.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with references to the following figures, wherein.

DETAILED DESCRIPTION OF EXEMPLARY EMBODIMENTS

In various exemplary embodiments of the systems and methods according to this invention, measuring the navigability of a web site is determined by the amount of "information scent" that is absorbed by simulated users "surfing" through the web site. The rate at which the simulated users absorb information scent can be viewed as a measurement of accomplishing the users' information goals. As users reach their target information, the users terminate their navigation in the web site. Thus, the rate at which users finish is a measurement of the navigability of the web site.

Figure 1:
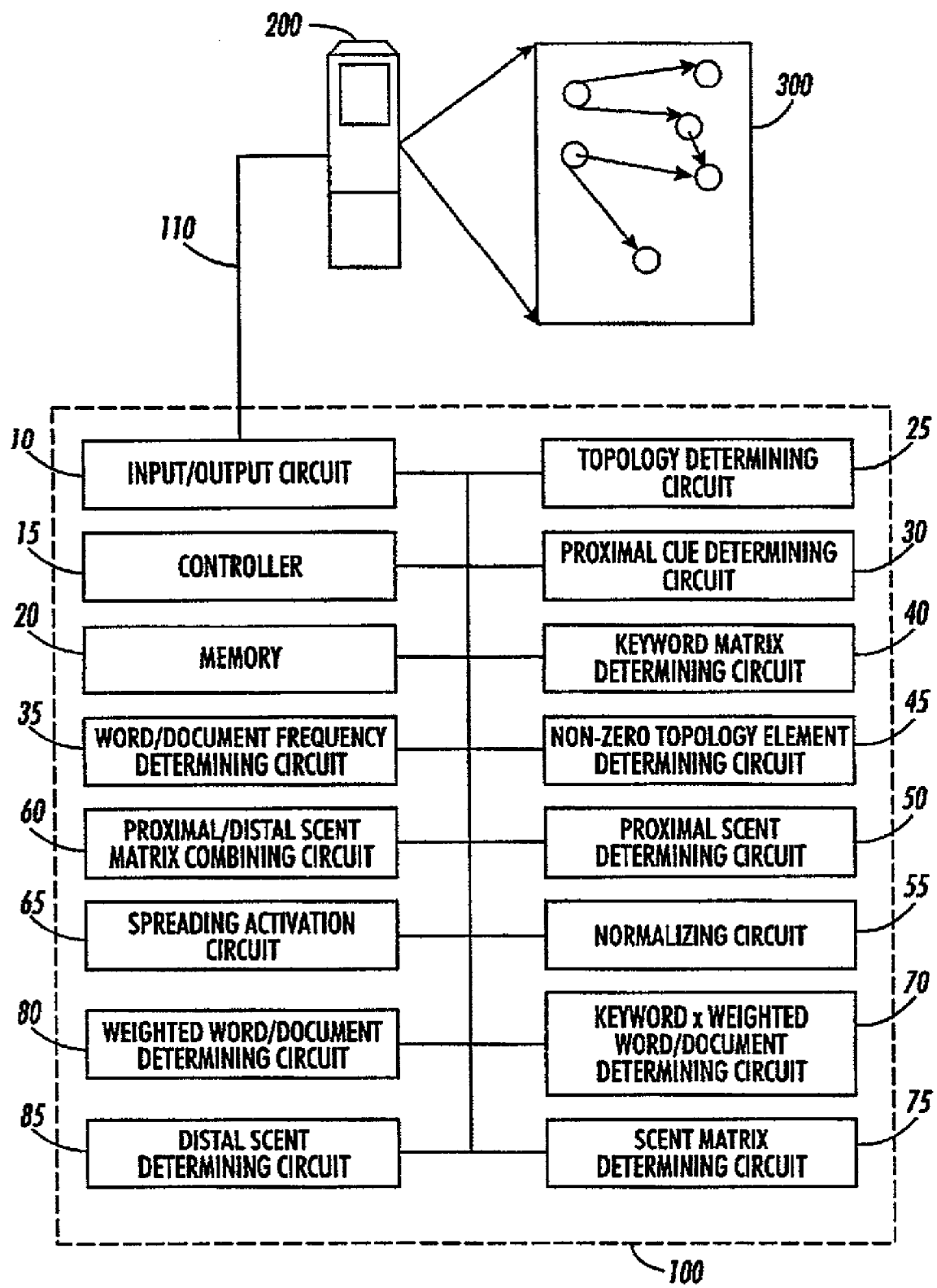
FIG. 1 is a block diagram showing an exemplary embodiments of a system for measuring navigability of a document collection or a web site according to this invention.

FIG. 1 shows an exemplary block diagram of an exemplary embodiment of a system 100 for measuring navigability of a web site according to this invention. The system 100 includes a controller 15, a memory 20, a topology determining circuit 25, a proximal cue determining circuit 30, a word/document frequency determining circuit 35, a keyword matrix determining circuit 40, a non-zero topology element determining circuit 45, a proximal scent determining circuit 50, a normalizing circuit 55, a proximal and distal scent combining circuit 60, a spreading activation circuit 65, a scent matrix determining circuit 75, a keyword×weighted word/document determining circuit 70, a weighted word/document matrix determining circuit 80, a distal scent determining circuit 85 and an input/output circuit 10 for connecting to a communications link 110. A web server 200 provides access to a document collection or web site 300 over the communications link 110.

The input/output circuit 10 retrieves a document or web page of a web site 300 over the communication link 110 from the web server 200 and stores the document or web page in the memory 20. This exemplary embodiment describes the use of a web server. However, it will be apparent that the system for measuring navigability a web site according to this invention may be practiced using any system or method of providing access to document collections, web sites or any other type of content portions in which links, references and/or connection between the documents, web pages or content portions are provided.

As the input/output circuit 10 retrieves each document or web page of the site to be analyzed, the topology determining circuit 25 builds an exemplary topology matrix describing the links or connections between each document or web page retrieved. For purposes of description, the exemplary web site 300 shows a limited number of documents or web pages and associated links. However, any number of documents or web pages may be processed using the systems and methods of this invention.

As the input/output circuit 10 retrieves each document page of the document collection or web site 300, the topology of the document or web site is determined using the topology determining circuit 25. Each link or connection on a document or web page is then analyzed by the proximal cue determining circuit 30. The proximal cue determining circuit 30 identifies information cues that convey information to the simulated user. For example, the text associated with a link or connection may provide proximal cues as to the nature of the linked information. The proximal cue determining circuit 30 then breaks the link or connection down into constituent words. The proximal cue words may also include portions of the text surrounding the link. So, for example, if a link says "Buy a gift certificate", then the words "buy", "a", "gift", and "certificate" are used as words that describe the proximal cues. If the link, in addition, have words near it that says "click here to purchase gift certificates that are discounted", then these words are also used to describe the proximal cues. If a link or connection is in typical Uniform Resource Locator (URL) form, the punctuation and "I" characters associated with the URL are used to define word boundaries. For example, if the link or URL "xerox.com/products/support/index.html" is processed, the words xerox, com, products, support and index are all added as proximal cue words to the keyword matrix for the relevant link. In various alternative embodiments, additional weighting factors may be added to the proximal cue word information, such as the location of the link within the document or web page. For example, weighting factors may accord higher importance to cues words that appear higher up in the structure of a document or web page.

If the link is an image link such as a GIF, JPEG, PNG, BMP or any other image file type, the number of proximal cue words derivable from the link may be limited or nonexistent. In addition, determining proximal cue words for image links is a difficult problem. If the image is analyzed, a large increase in processing time and required resources will result. Also, determining the meaning or semantics of an image based on image analysis is an extremely complicated and error prone process. However, as web site developers attempt to improve the navigability of their web sites, the use of image links has increased. Accordingly, it is important to include image links when determining the proximal cues to which a simulated or objective user responds.

To determine the words that might describe an image, the following strategy may be used. If the controller 15 determines that the stored document or web page is an image link, then the distal document or web page that is linked to the image is retrieved. In the exemplary embodiment, the proximal cue word information from the link and/or text surrounding the link are analyzed by the proximal cue determining circuit 30. The linked to or distal document or web page may also be analyzed for proximal cue words by the proximal cue determining circuit 30. In this way, the linked to or distal document or web page serves as a proxy to supplement or replace proximal cue word information that is insufficient or unavailable on the current or proximal page for the image link. In various alternative embodiments, the linked to or distal information used may include the distal document title and the document text, either alone or in combination with proximal cue information such as the cue words from the text surrounding the image link. Entries reflecting the presence of the proximal cues are then stored in the keyword matrix data structure stored in the memory 20. Depending on the source of the words (title vs. body vs. headers), the words might be weighted differently, thus marking some words as more important than others.

Once the topology determining circuit 25 has determined all the topology information for a document collection or web site, the information is stored in the exemplary topology matrix data structure that is stored in the memory 20. The word/document frequency determining circuit 35 determines the word/document frequency of each of the relevant words in the document collection or set of web pages making up the web site 300. The weighted word/document determining circuit 80 then determines the weighted Term Frequency by Inverse Document Frequency (TF.IDF) for each of the words in the document collection or web site. TF.IDF is an information retrieval technique that calculates term importance of a word by weighting the word based on how frequently it occurs in the document collection or web site. Further information on TF.IDF is found in Schuetz, H. et al., "Foundations of Statistical Natural Language Processing," Cambridge, Mass.: MIT Press, 1999.

The non-zero topology element determining circuit 45 then analyzes the exemplary topology matrix data structure stored in the memory 20. Each of the non-zero elements of the topology matrix stored in the memory 20 are then identified.

For each of the identified non-zero topology elements in the memory 20, the controller 15 identifies the relevant link/document from the topology matrix. The link/document identification information is then passed to the keyword matrix determining circuit 40. The keyword matrix determining circuit 40 analyzes the proximal matrix stored in the memory 20 for entries corresponding to the link/document identification information. The non-zero entries in the proximal cue word matrix entry for the link/document indicate relevant words associated with the link and are specified as proximal cue word vector.

For each non-zero entry specified in the proximal cue word vector, the proximal scent determining circuit 50 then determines the proximal scent by determining the similarity between each entry in the proximal cue word matrix stored in the memory 20 and a user information need vector which has been previously determined and stored in the memory 20. The user information need vector represents words that help a user make navigational choices based on information need. In the exemplary embodiments according to this invention, the similarity is determined by multiplying the proximal cue word matrix stored in the memory 20 by the weighted word/document frequency matrix stored in the memory 20 using proximal cue word x weighted word/document determining circuit 70 and multiplying the result by the user information need vector stored in the memory 20. However, in various other exemplary embodiments according to this invention, any known or later developed technique of determining similarity may be employed. For example, a determination of the cosine of the angle between the proximal cue word vector and the user information need vector may be used.

The distal scent determining circuit 85 determines the distal scent matrix using information from the connected to or distal document or web pages. The connected to or distal documents or web pages provide the cue information to determine the distal scent matrix.

The proximal and distal scent combining circuit 60 is then activated to substitute the previously determined distal scent matrix entries into the proximal scent matrix when the distal scent matrix entry is non-zero and the proximal scent entry is zero. The new matrix created is called the scent matrix. In this way, distal information is provided as a substitute when there is insufficient proximal information. It will be apparent that other techniques of determining the proportions of proximal and distal scent to be combined are within the scope of this invention. For example, the relationship: Scent=ALPHA*(Proximal_Scent)+BETA*(Distal_Scent) (1) may be used, where 0<=ALPHA<=1 and 0<=BETA<=1.

The normalizing circuit 55 is then activated to create a normalized scent matrix in which the columns of the scent matrix sum to one. This reflects that the sum of all probabilities for a user navigation choice at that particular point is one. Each entry reflects the likelihood that a user with the specified information need will choose the associated path.

Further information on how users might surf through a web site based on some given information may be found in copending application Ser. No. 09/540,976, and copending Ser. No. 09/820,706, each of which is incorporated herein by reference in its entirety.

The controller 15 then selects the initial or starting page that may be previously stored in the memory 20. The initial or starting page reflects the first document or page the simulated or objective user selects in traversing the document collection or web site. The first document or page may be any document or page within the document collection or web site. The spreading activation circuit 65 is then initialized with the number of iterations to be run. Spreading activation essentially simulates how users flow through the web site according to the scent matrix values. A spreading activation algorithm may be used, for example, as discussed in U.S. Pat. No. 5,835,905 to Pirolli, et al., which is incorporated herein by reference in its entirety. After the specified number of iterations, the resulting spreading activation vector is analyzed. The activation vector entries reflect the likelihood the simulated or objective user will arrive at the indicated location.

As a web site designer changes the document collection or web site, an objective indication of the document collection or web site navigability can be generated. In this way, the web site designer can interactively adjust the design of a web site and develop better techniques to deliver the desired information to the target audience.

To measure navigability of the web site or document collection 300, the controller 15 modifies the scent matrix in the memory 20 by zeroing out the columns of the scent matrix representing the selected target pages. This modification causes the target pages in the web site to be in absorption states from which the navigability of the website 300 can be measured. When a page is in an absorption state, a simulated user that reaches the page becomes absorbed and no longer performs any searches. The intuition is that when the simulated user reaches the target page, the user's information need is satisfied and the user terminates the search process.

The spreading activation circuit 65 uses the modified scent matrix to initiate a spreading activation that simulates a number of users flowing through various links in the web site 300. The spreading activation circuit 65 stimulates a number of spreading activations in accordance with a set number of iterations that represents the number of searches performed by each user. The controller 15 sums the number of activations in the last iteration which represents the number of users still searching for the selected target documents. Accordingly, the navigability of the website is measured by the number of users still searching for the selected pages after the last iteration or the last opportunity to search.

Figure 2:
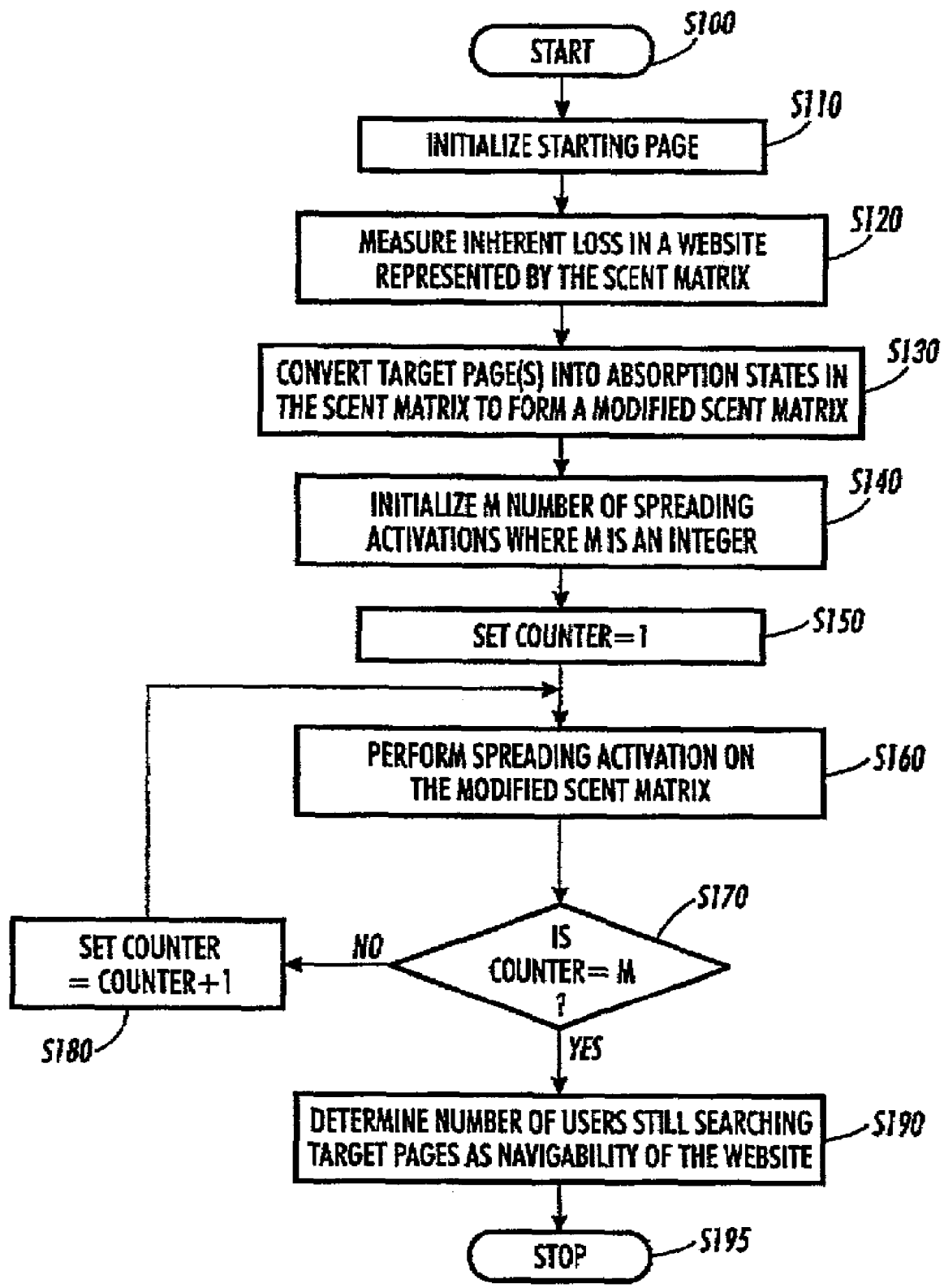
FIG. 2 is a flowchart of an exemplary embodiments of a method for measuring navigability of a web site according to this invention.

FIG. 2 shows a flowchart of an exemplary method for measuring the navigability a web site according to this invention. Control begins at S100 and continues to step S110 where the initial or starting page is selected for the simulated users. Next, in step S120, an inherent loss in the simulated user flow process is measured. Inherent loss occurs because the scent matrix that describes the various links in the web site may have leaf nodes in the graph that terminate and do not connect to other nodes. A simulated user reaching a terminated node is trapped in the node because the spreading activation process previously described does not have backtrack capabilities, and the simulated user may currently only move forward in the spreading activation flow process. Because inherent loss behaves like an absorption state of a selected target page, inherent loss should be factored out when measuring the navigability of the web site since inherent loss may represent users that were trapped in a node and never reached the selected target page of the web site. There are two exemplary methods to account for this inherent loss of users due to these leaf nodes. One method is to calculate the inherent loss and compensate for it later. The other method is to enable the users to backtrack by having those who reach leaf nodes start over at the starting point. These two exemplary methods of accounting for or factoring out inherent loss are described hereinafter with respect to FIG. 3 and FIG. 4.

From step S120, control continues to step S130 where the selected target pages are converted into absorption states. The intuition is that as simulated users reach their respective target pages the users terminate their searches because the target page satisfies the users' needs. Accordingly, by placing the target pages in absorption states, the simulated users reaching the target pages get "absorbed" by the target pages and further searches are no longer needed. The rate at which the users get absorbed in the target pages corresponds to the navigability of the web site.

In step S130, the target pages, which are represented as nodes in the scent matrix, are modified so that the nodes become termination points. According to one embodiment, where the original scent matrix is S, the columns in the S scent matrix referring to the target pages are zeroed out. Thus, for example, if the target page is numbered as t, then the t-th column of the S scent matrix is zeroed out. The result is the modified scent matrix S'. The i-th row of the matrix S" describes all of the nodes that are reachable by the i-th page. The j-th column of S" describes all of the nodes that can reach the j-th page.

Control continues to step S140, where a number of spreading activations to be performed on the modified scent matrix is determined. However, it should be appreciated that the number of spreading activations can be predetermined, thereby obviating this step. Alternatively, the number of spreading activations can be generated randomly. From step S140, control continues to step S150, where a counter is set to one. Then the process continues to step S160.

In step S160, an iteration of a spreading activation is performed on the modified scent matrix. The spreading activation simulates a number of users searching in the website which is represented by the modified scent matrix. During the spreading activation, simulated users that "find" the target pages are absorbed by the target pages and no longer participate in the spreading activation. Thus, the navigability of the web site is measured by the rate at which the simulated users are absorbed by the target pages. Alternatively, or in combination, the navigability of the web site can be determined by the difference between the initial number of simulated users at the start of the spreading activation and the remaining number of simulated users at the end of the iterative spreading activation process, which is implemented in this embodiment.

Control continues to step S170 where a determination is made as to whether the counter has reached the maximum number of iterations to be performed by the spreading activation. If the counter has not reached the maximum number, then in step S180 the counter is incremented by one and control returns to step S160. Otherwise, if the counter has reached the maximum number of iterations then control continues to step S190.

In step S190, a determination is made as to the number of simulated users that are remaining after the last iteration of the spreading activation. This number, which hereinafter will be defined as delta, defines the number of simulated users still searching for the target pages. However, the value delta needs to be corrected to account for inherent loss represented by users that were lost due to leaf nodes and never reached the selected target pages. After the corrected delta is determined the process continues to step S195, where the process ends.

Figure 3:
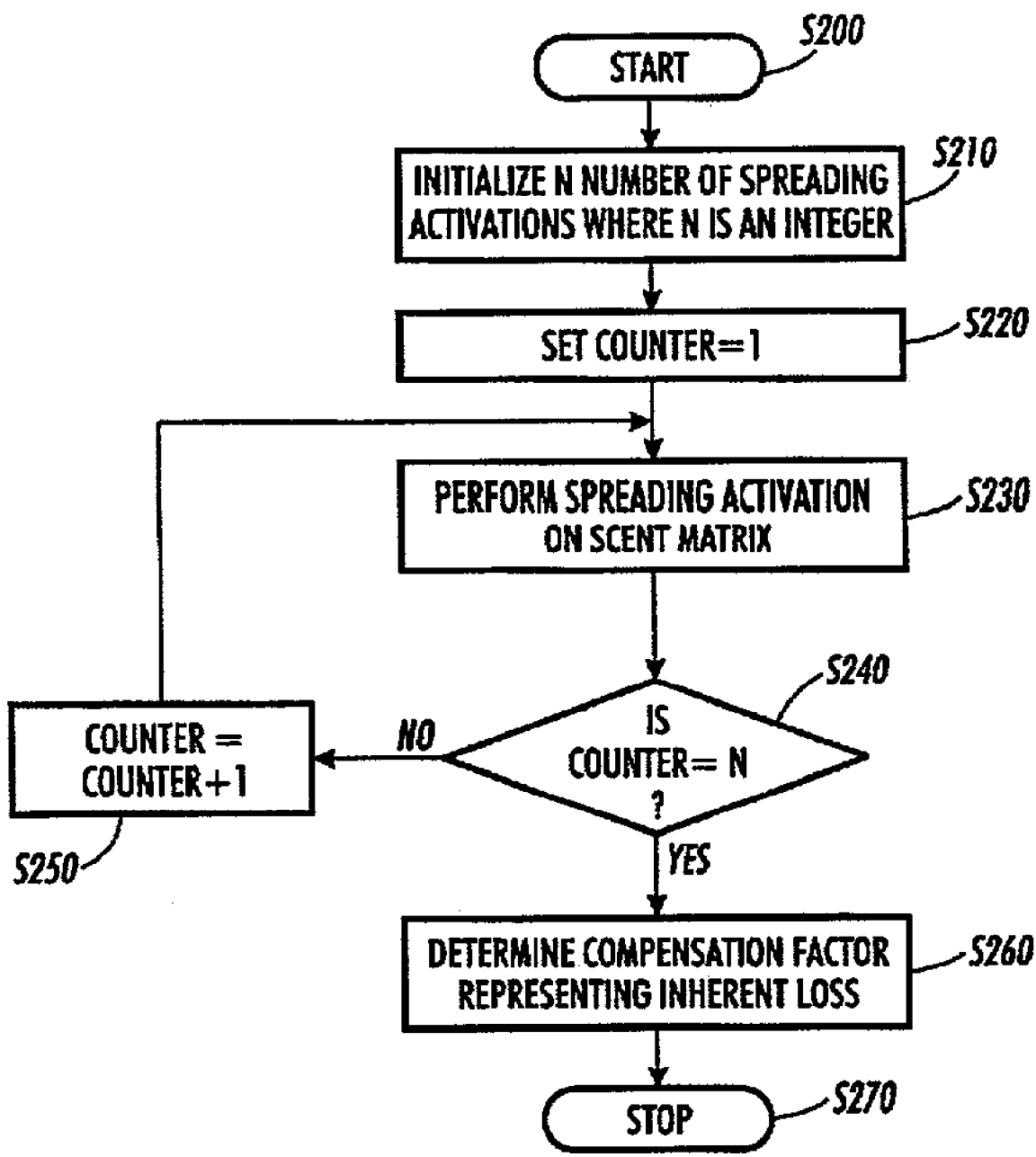
FIG. 3 is a flowchart of a first exemplary embodiment of a method for measuring an inherent loss in a web site according to this invention.

FIG. 3 shows a flowchart of a first exemplary method for measuring the inherent loss in a web site according to this invention. Control begins at step S200 and continues to step S210. In step S210, a number of spreading activations to be performed on the scent matrix is determined. However, it should be appreciated that the number of spreading activations can be predetermined, thereby obviating this step. Alternatively, the number of spreading activations can be generated randomly.

Control continues to step S220, where a counter is set to one. Control continues to step S230, where an iteration of a spreading activation is performed on the scent matrix. The spreading activation simulates a number of users searching in the website represented by the scent matrix, where an iteration represents a user "click". Control continues to step S240, where a determination is made as to whether the counter has reached the maximum number of iterations to be performed by the spreading activation. If the counter has not reached the maximum number, then the counter is incremented by one in step S250 and control returns to step S230. Otherwise, if the counter has reached the maximum number of iterations, control continues to step S260.

In step S260, a determination is made as to the number of simulated users that are remaining after the last iteration of the spreading activation. This number, which hereinafter will be defined as gamma, defines a compensation factor that represents the inherent loss of the web site. Control continues to S270, where the method ends. When the above inherent loss process is used, the navigability of the web site is corrected with a value gamma representing the inherent loss. Thus, the navigability of the web site is represented as delta/gamma, which corrects the value delta by the inherent loss.

Figure 4:
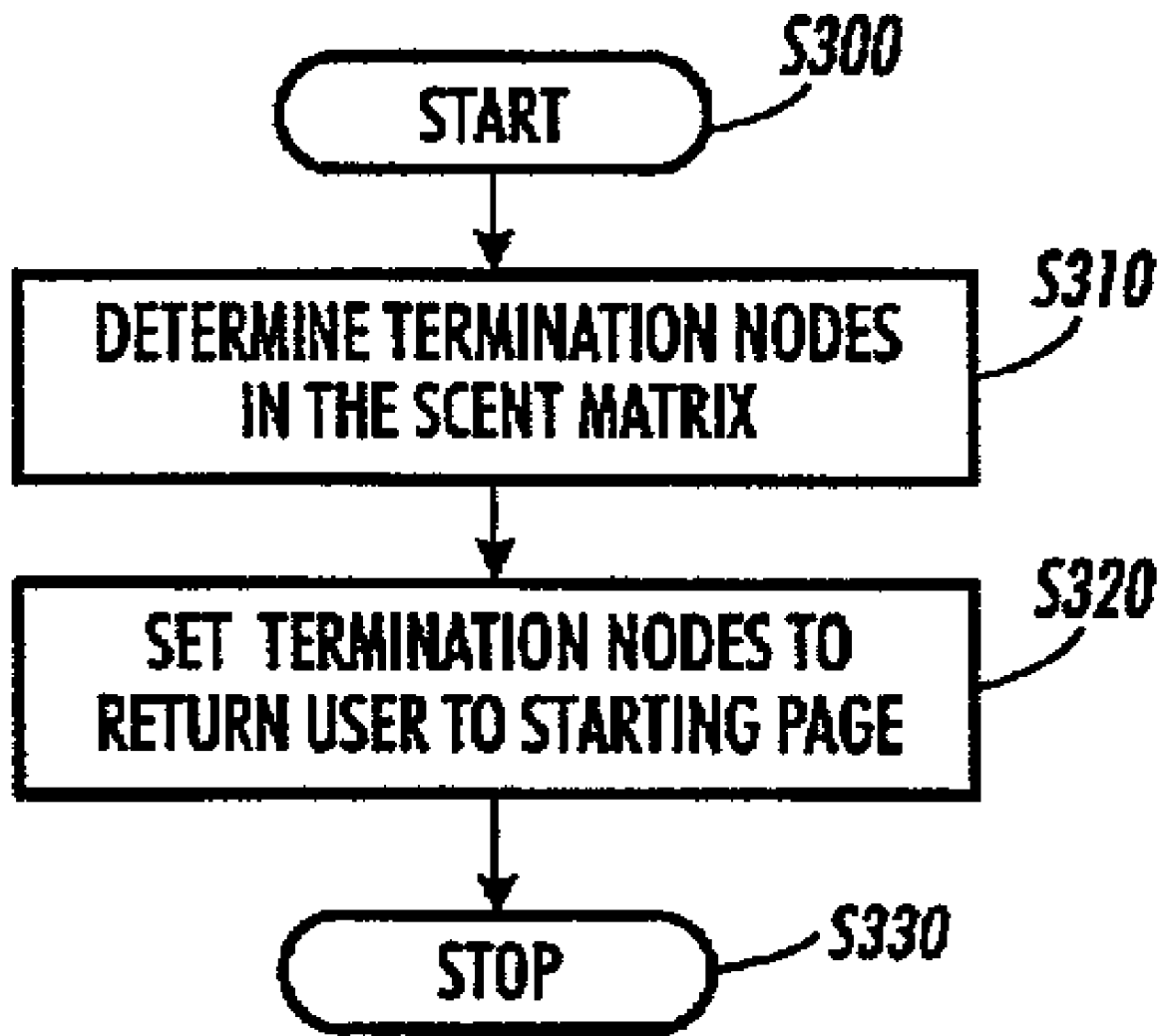
FIG. 4 is a flowchart of a second exemplary embodiment of a method for measuring the inherent loss in a web site according to this invention.

FIG. 4 shows a flowchart of a second exemplary method for dealing with the inherent loss in a web site according to this invention. Control begins at step S300 and continues to step S310, where the termination nodes in the scent matrix are determined. According to one method, the scent matrix is scanned for nodes in the matrix that have a value of zero for the node's row. Nodes that have a zero value in its row represent a termination leaf node. Once the determination is made, control continues to step S320, where these termination leaf nodes are modified so that any user reaching these nodes are returned to the starting page. For example, termination nodes are set to S(j, starting page)=1.0, where node j is a termination leaf node. Any user flow reaching node j will then start over at the starting page. Control continues to step S330, where the method ends. When the above inherent process is used, no correction is necessary and the navigability of the web site is measured directly by delta.

In the various exemplary embodiments outlined above, the system 100 for predicting the usage of a web site can be implemented using a programmed general purpose computer. However, the system 100 for measuring navigability of a web site can also be implemented using a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 2–4 can be used to implement the system 100 for measuring the navigability of the web site.

Each of the circuits 25–80 of the system 100 for measuring the navigability of the web site outlined above can be implemented as portions of a suitably programmed general purpose computer. Alternatively, circuits 25–80 of the system 100 for measuring navigability of the web site outlined above can be implemented as physically distinct hardware circuits within an ASIC, or using a FPGA, a PDL, a PLA or a PAL, or using discrete logic elements or discrete circuit elements. The particular form each of the circuits 25–80 of the system 100 for measuring the navigability of the web site outlined above will take is a design choice and will be obvious and predicable to those skilled in the art.

Moreover, the system 100 for measuring navigability of the web site and/or each of the various circuits discussed above can each be implemented as software routines, managers or objects executing on a programmed general purpose computer, a special purpose computer, a microprocessor or the like. In this case, the system 100 for measuring the navigability of the web site and/or each of the various circuits discussed above can each be implemented as one or more routines embedded in the communications network, as a resource residing on a server, or the like. The system 100 for measuring the navigability of the web site and the various circuits discussed above can also be implemented by physically incorporating the system for predicting the usage of the a web site into a software and/or hardware system, such as the hardware and software systems of a web server.

As shown in FIG. 1, the memory 20 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a write-able or rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication link 110 shown in FIG. 1 can be any known or later developed device or system for connecting a communication device to the system 100 for measuring the navigability of the web site, including a direct cable connection, a connection over a wide area network or a local area network, a connection over an intranet, a connection over the Internet, or a connection over any other distributed processing network or system. In general, the communication link 110 can be any known or later developed connection system or structure usable to connect devices and facilitate communication.

Further, it should be appreciated that the communication link 110 can be a wired or wireless link to a network. The network can be a local area network, a wide area network, an intranet, the Internet, or any other distributed processing and storage network.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of this invention.

The invention claimed is:

1. A processor implemented method of assessing usability of a collection of contents for use in the prediction of user traffic flow in hypermedia linked collections of documents without relying on observed usage information, the method comprising:

associating at least one content in the collection of contents with a connection in a connection topology and at least one proximal information with the connection in the connection topology;

converting at least one content in the collection of contents into a termination point, wherein a movement through the collection of contents is terminated at the termination point;

initiating at least one first spreading activation from a content in the collection of contents, the first spreading activation simulating a number of predictable movements of one or more simulated users through the collection of contents;

measuring an inherent loss corresponding to the simulated users remaining after spreading activation;

determining at least a first value of the number of predictable movements through the collection of contents that reached the termination point based on the proximal information associated with the connection in the connection topology; and storing a predicted usability value, based on the first value and the inherent loss, in association with the collection of contents.

2. The method of claim 1, wherein prior to converting at least one content in the collection of contents into a termination point, the method further comprises:

initiating at least one second spreading activation from a content in the collection of contents, the second spreading activation simulating a number of predictable movements through the collection of contents;

determining at least a second value of the number of predictable movements through the collection of contents based on the proximal information related to the connection in the connection topology; and compensating the first value with the second value.

3. The method of claim 2, wherein initiating at least one second spreading activation includes, initiating a predetermined number of iterations of the second spreading activation.

4. The method of claim 1, wherein initiating at least one first spreading activation includes, initiating a predetermined number of iterations of the first spreading activation.

5. The method of claim 4, determining at least a first value of the number of predictable movements through the collection of contents that reached the termination point comprises determining the first value after each iteration.

6. A programmed microprocessor and peripheral integrated circuit apparatus for assessing usability of a collection of contents for use in the prediction of user traffic flow in hypermedia linked collections of documents without relying on observed usage information, the apparatus comprising:

a topology determining circuit that associates at least one content in the collection of contents with a connection in a connection topology;

a proximal cue analyzing circuit that associates at least one proximal information associated with the connection in the connection topology;

a controller that converts at least one content in the collection of contents into a termination point, wherein a movement through the collection of contents is terminated at the termination point; and a spreading activation circuit that initiates at least one first spreading activation from a content in the collection of contents, the first spreading activation simulating a number of predictable movements of one or more simulated users through the collection of contents;

wherein the controller determines at least a first value of the number of predictable movements through the collection of contents that reached termination point based on the proximal information associated with the connection in the connection topology, determines an inherent loss corresponding to the simulated users remaining after spreading activation, and stores a predicted usability value in a memory in association with the collection of contents, the predicted usability value determined based on the first value and the inherent loss.

7. The apparatus of claim 6, further comprising:

the spreading activation circuit to initiate at least one second spreading activation from a content in the collection of contents, the second spreading activation simulating a number of predictable movements through the collection of contents prior to the controller converting at least one content in the collection of contents into a termination point; and the controller to determine at least a second value of the number of predictable movements through the collection of contents based on the proximal information related to the connection in the connection topology, and to compensate the first value with the second value.

8. The apparatus of claim 7, wherein the controller to initiates a predetermined number of iterations of the second spreading activation.

9. The apparatus of claim 6, wherein the controller initiates a predetermined number of iterations of the first spreading activation.

10. The apparatus of claim 9, wherein the controller determines the first value after each iteration.

11. A computer-readable storage medium for storing computer-executable instructions for performing a method of assessing usability of a collection of contents for use in the prediction of user traffic flow in hypermedia linked collections of documents without relying on observed usage information, the method comprising:

associating at least one content in the collection of contents with a connection in a connection topology and at least one proximal information with the connection in the connection topology;

converting at least one content in the collection of contents into a termination point, wherein a movement through the collection of contents is terminated at the termination point;

initiating at least one first spreading activation from a content in the collection of contents, the first spreading activation simulating a number of predictable movements of one or more simulated users through the collection of contents;

measuring an inherent loss corresponding to the simulated users remaining after spreading activation;

determining at least a first value of the number of predictable movements through the collection of contents that reached the termination point based on the proximal information associated with the connection in the connection topology; and storing a predicted usability value, based on the first value and the inherent loss, in association with the collection of contents.

12. The computer-readable storage medium of claim 11, wherein prior to converting at least one content in the collection of contents into a termination point, the method further comprises:

initiating at least one second spreading activation from a content in the collection of contents, the second spreading activation simulating a number of predictable movements through the collection of contents;

determining at least a second value of the number of predictable movements through the collection of contents based on the proximal information related to the connection in the connection topology; and compensating the first value with the second value.

13. The computer-readable storage medium of claim 12, wherein the initiating at least one second spreading activation includes, initiating a predetermined number of iterations of the second spreading activation.

14. The computer-readable storage medium of claim 11, wherein the initiating at least one first spreading activation includes, initiating a predetermined number of iterations of the first spreading activation.

15. The computer-readable storage medium of claim 14, wherein the determining at least a first value of the number of predictable movements through the collection of contents that reached the termination point comprises determining the first value after each iteration.

* * * * *

UNITED STATES PATENT AND TRADEMARK OFFICE
CERTIFICATE OF CORRECTION

PATENT NO.        : 7,203,899 B2
APPLICATION NO.   : 10/063344
DATED             : April 10, 2007
INVENTOR(S)       : Ed H. Chi et al.

Page 1 of 1

It is certified that error appears in the above-identified patent and that said Letters Patent is hereby corrected as shown below:

Column 1, line 15, insert as a new paragraph:

This invention was made with Government support under N00014-96-C-0097 awarded by ONR. The Government has certain rights in this invention.

Signed and Sealed this

Thirteenth Day of May, 2008

JON W. DUDAS
*Director of the United States Patent and Trademark Office*